(No Model.)
F. K. IRVING.
ELECTRIC METER.
No. 451,125. Patented Apr. 28, 1891.
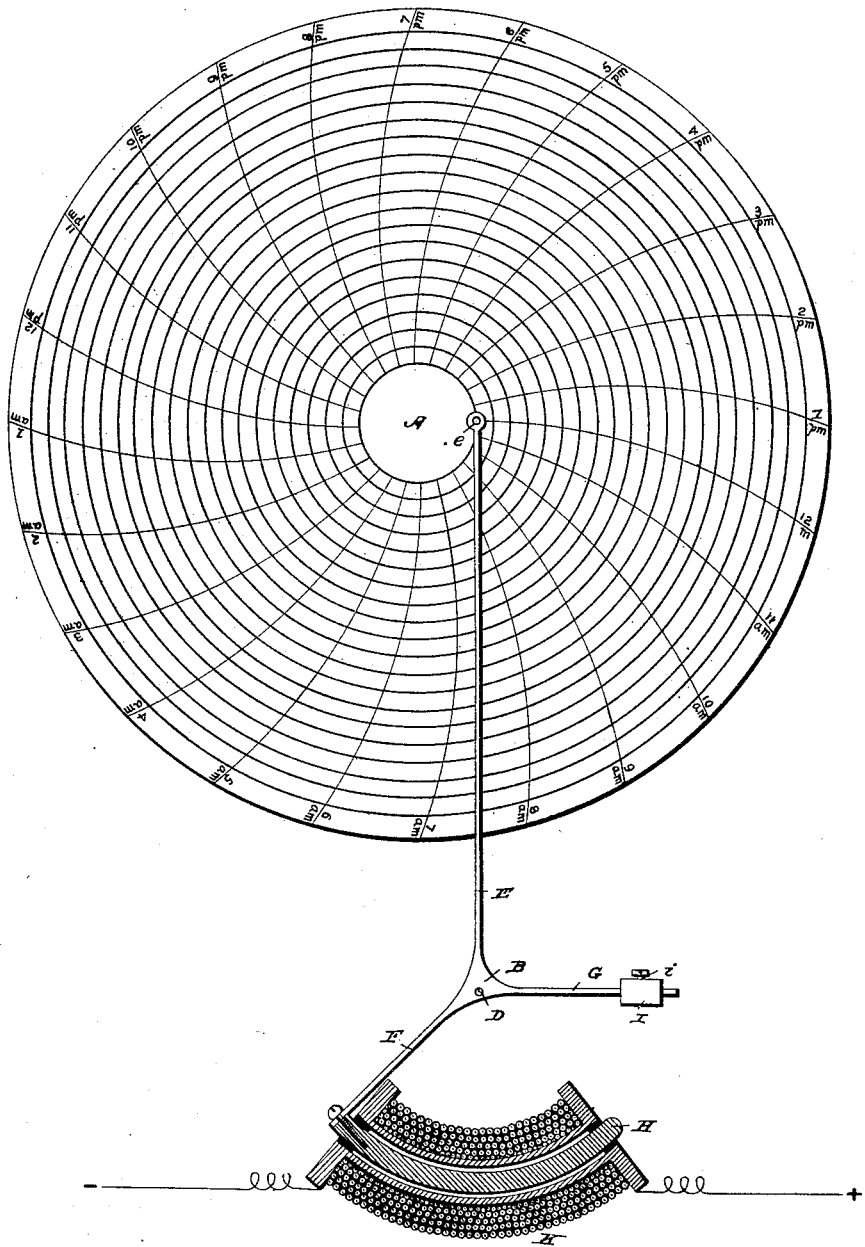
WITNESSES:
INVENTOR
Frank K. Irving
BY
ATTORNEY.

UNITED STATES PATENT OFFICE.

FRANK K. IRVING, OF NEW YORK, N. Y.

ELECTRIC METER.

SPECIFICATION forming part of Letters Patent No. 451,125, dated April 28, 1891.

Application filed October 22, 1890. Serial No. 368,971. (No model.)

*To all whom it may concern:*

Be it known that I, FRANK K. IRVING, a citizen of the United States, residing at New York, in the county of New York and State of New York, have invented certain new and useful Improvements in Ammeters; and I do declare the following to be a full, clear, and exact description of the invention, such as will enable others skilled in the art to which it appertains to make and use the same, reference being had to the accompanying drawing, and to the letters of reference marked thereon, which form a part of this specification.

My invention has relation to devices for recording the quantity or varying quantity of a current of electricity; and the novelty consists in a solenoid located in the circuit to be measured, a core adapted to be operated by the action of the current upon the solenoid, and means, hereinafter more fully described, for recording upon a dial the motion, time, and duration of the movement of the core as influenced by the current through the medium of the solenoid, as will be more fully set forth and particularly claimed.

The figure in the drawing is an elevation of my recording-ammeter.

A represents a dial operated by a time-movement, and the radial divisions thereof may be arranged for a day or a number of days to correspond to the movement employed, while the concentric divisions of the dial are made to correspond to the volume or quantity of the current, and for the purpose of making these concentric divisions definite the innermost circle represents zero, or the point at which the recorder will rest when the meter is normal. The next circle may represent a predetermined number of ampères, and so on indefinitely to the marginal circle.

Upon a pivot D is mounted a lever B, provided with three arms E, F, and G, the arm E having a recording pen or pencil $e$, the arm F carrying an iron core H, and the arm G an adjustable weight I, provided with a set-screw $i$, by means of which the lever may be adjusted to a normal position, which is attained when the recording-point $e$ is set at the inner or zero circle.

The core H is surrounded by a helix or solenoid K, which is located in the circuit through which the current to be measured passes.

From this description it is obvious that a current passing through the solenoid will tend to change the normal position of the core, the motion depending upon the quantity of the current passing. Consequently the pencil will be deflected outwardly upon the dial and trace a record of the current, and as the duration of the quantity is noted by the time or radial lines and the quantity itself by the arbitrary concentric circle it follows that a true record of the quantity and the time of the duration of that quantity is secured.

Having thus fully described my invention, what I claim is—

The combination, with a recording-dial, of an indicator-lever, its free end provided with a recording pen or pencil and mounted on a common pivot with an arm carrying an adjusting-weight and an arm provided with a segmentally-curved core surrounded by a correspondingly-curved solenoid located in the circuit to be measured, as and for the purpose set forth.

In testimony whereof I affix my signature in presence of two witnesses.

FRANK K. IRVING.

Witnesses:
 E. M. SANGER,
 HENRY J. ENNIS.